Nov. 7, 1967  R. SMALLEY  3,351,221
EXCAVATING AND/OR LOADING DEVICE
Filed Sept. 16, 1965  5 Sheets-Sheet 5

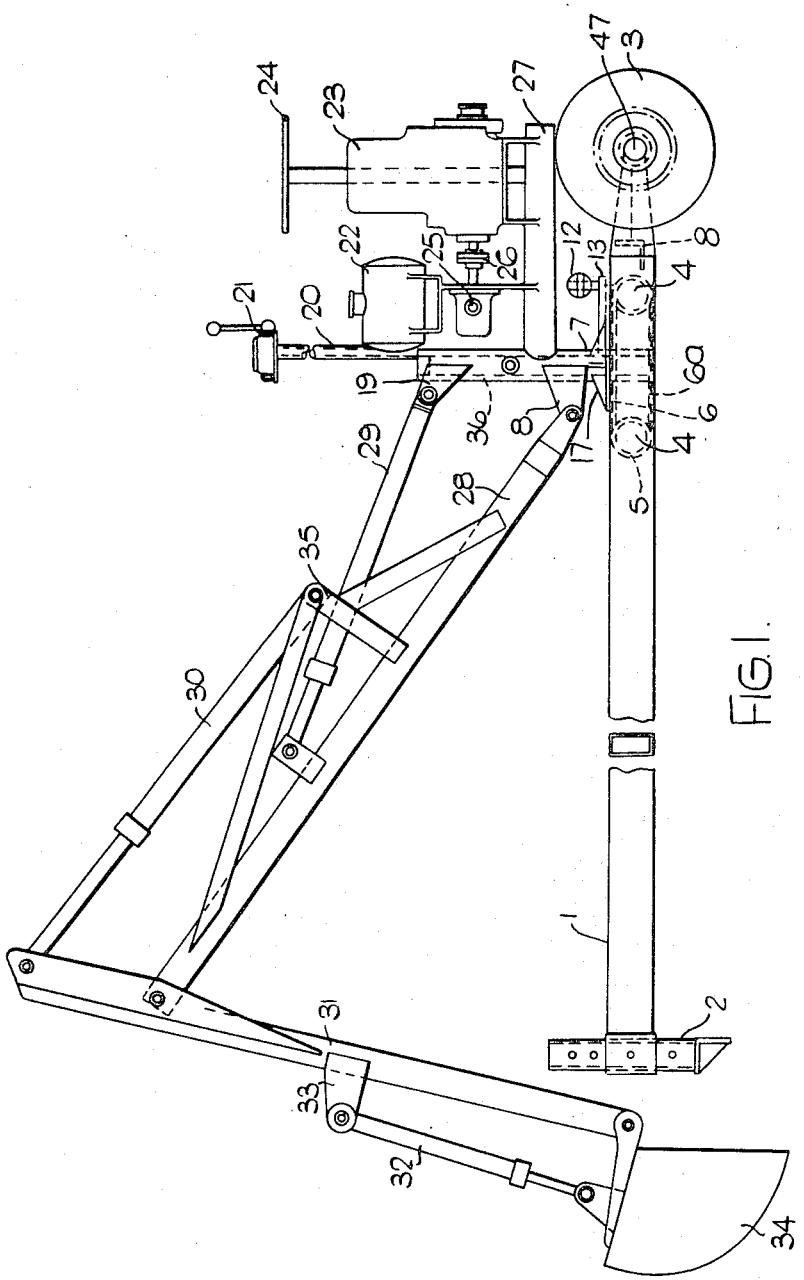

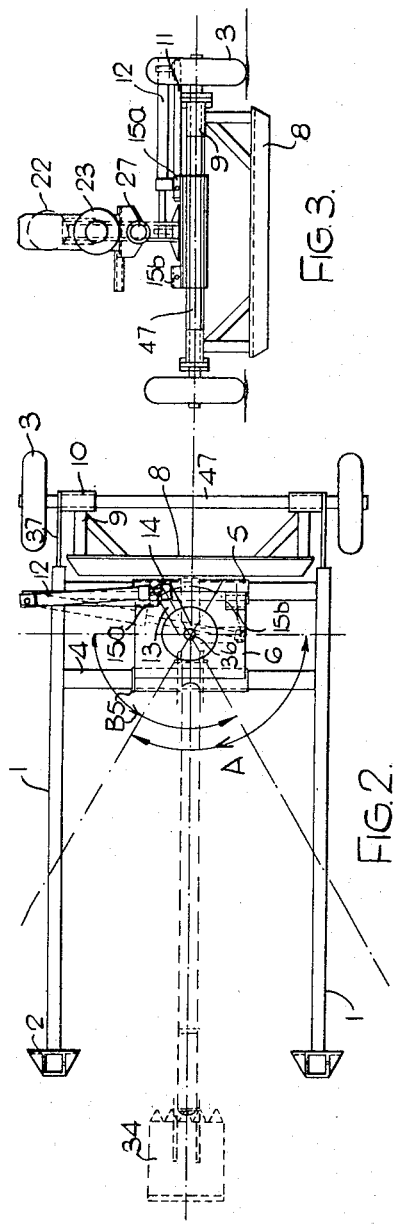

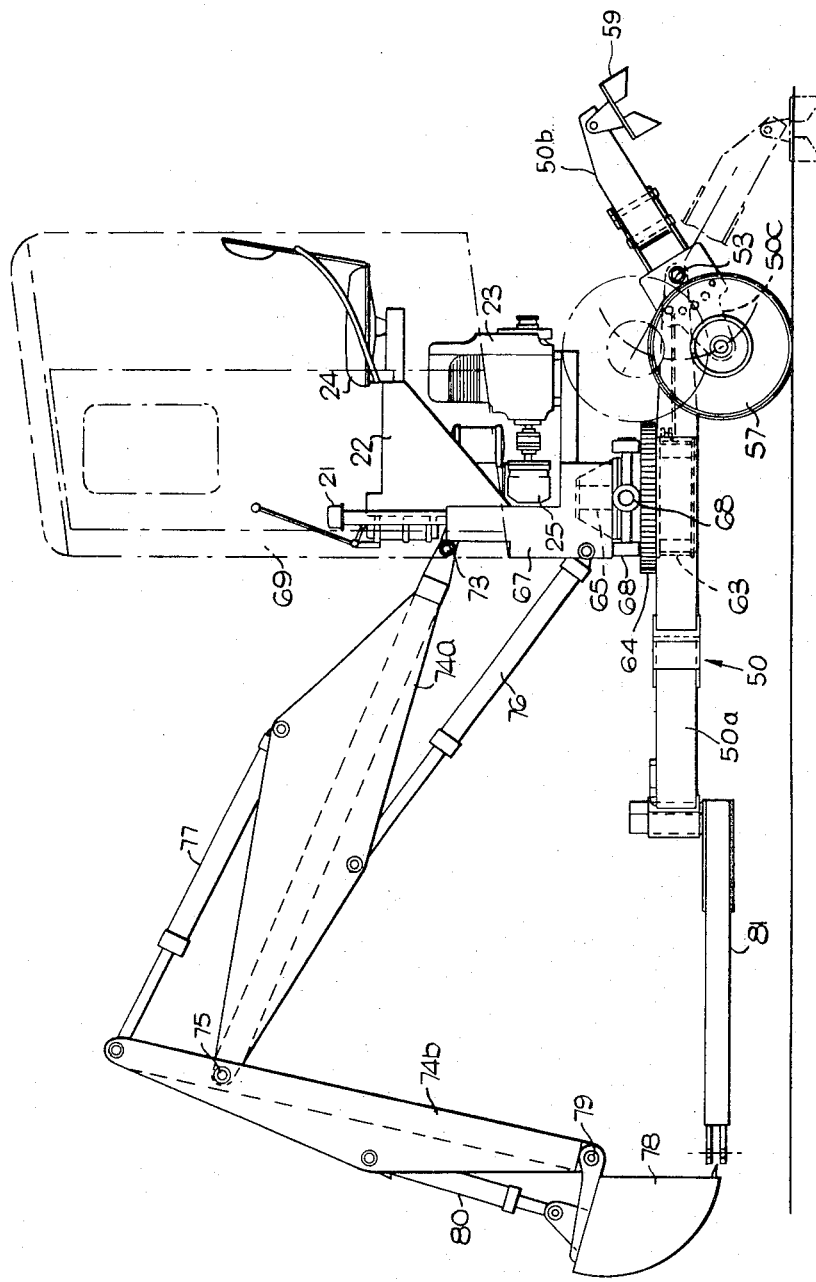

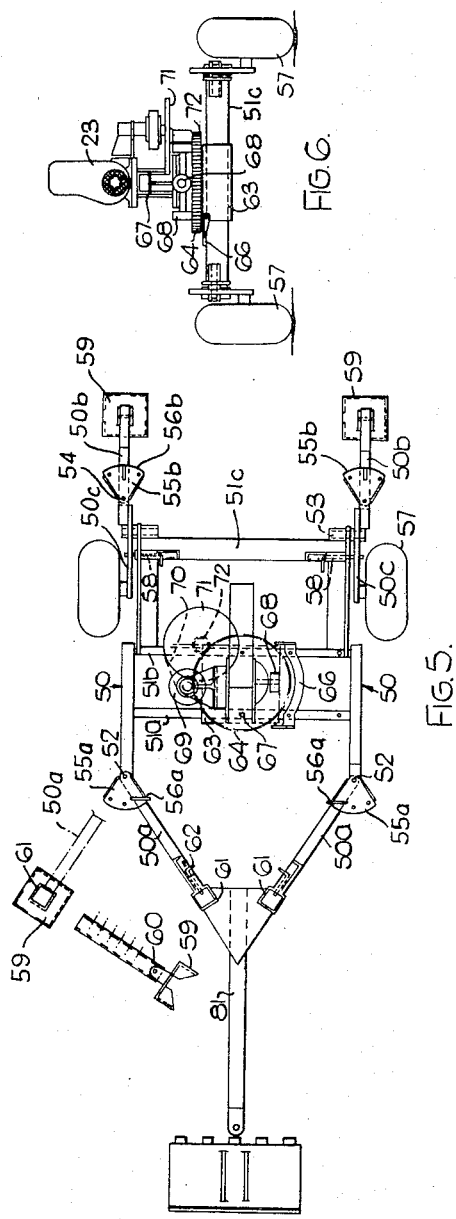

United States Patent Office 3,351,221
Patented Nov. 7, 1967

3,351,221
EXCAVATING AND/OR LOADING DEVICE
Richard Smalley, Osbournby, Sleaford, England, assignor to Richard Smalley (Engineering) Limited
Filed Sept. 16, 1965, Ser. No. 487,716
3 Claims. (Cl. 214—138)

ABSTRACT OF THE DISCLOSURE

A mobile back hoe device for excavating graves and the like. The device comprises a frame on which are mounted vertically adjustable front and rear auxiliary ground supports selectively adjustable into contact with a support surface to stabilize the over-all device during excavation. The front ground supports are supported on side members which are selectively adjustably pivotally mounted on the frame to facilitate connection to a tow bar assembly. The rear ground supports are connected to a vertically adjustable wheel assembly whereby upward movement of the wheel assembly results in downward movement of the rear ground support.

Figure 7:
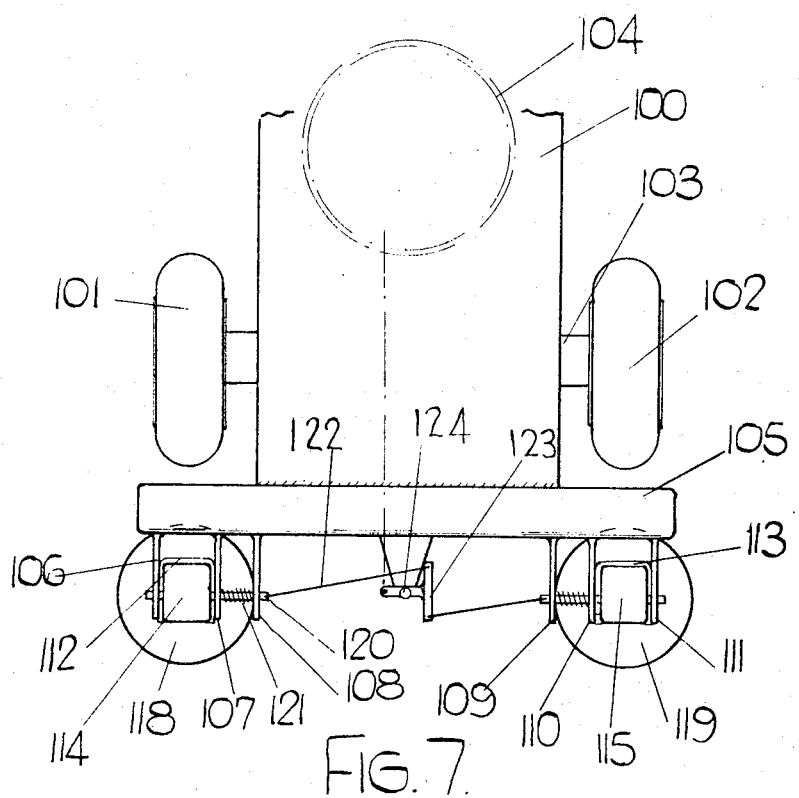

This invention is for improvements in or relating to excavating and/or loading devices and is particularly concerned with providing an excavating and/or loading device which is comparatively light in construction and in consequence comparatively easy to transport from one locality to another and which is substantially cheaper than hitherto known excavating and/or loading devices.

It is well known to provide for jib arrangements which extend from an operating base and which have at their free end buckets or loading devices and to provide hydraulic or other rams which operate the inter-connection of one or more jibs and the actuation of the buckets or the like at the ends of said jibs.

Hitherto it has been thought necessary to provide for means which not only firmly locate the base part of the jibs on the ground but which also involves a substantial amount of weight to prevent any undue disturbance of the apparatus when lifting or digging loads and to enable the bucket or the like at the end of the jib to have a sufficient purchase into the load which is to be moved or excavated.

It is one object of the present invention to provide a comparatively light and simple excavating and/or loading device and accordingly the present invention provides an excavating and/or loading device, having a support frame which is of forked form in plan and comprises two spaced side limbs, a jib pivotally movable on the frame about a vertical axis by means of a pivotal mounting at or adjacent to the inner end of the space between the side limbs and carrying an excavating and/or loading appliance, and means for actuating the jib and appliance to operate at least within the width of the fork forwardly or rearwardly of said vertical axis.

The expression "within the width of the fork" includes the area lying between the side limbs of said area and the area lying between imaginary extension lines of said limbs. By providing a forked frame and by confining the principal operations of the appliance to within the width of the fork (as herein defined) it has been found that the loading and/or excavating of material may be carried out by a device which does not involve the known customary principles of providing for substantial weight to hold the device steady. The frame may be substantially of U-shape or H-shape.

By suitable arrangements, the device according to the present invention may dig an area within the confines of the frame (but beyond the length of the limbs forming the frame) and thus the invention is particularly suitable for trench digging and/or for the digging of graves or large holes.

Preferably the pivotal mounting comprises a vertical pivot post supported from the frame on which post the jib is mounted.

There may be means for shifting the pivotal mounting widthwise of the frame (e.g. by a sliding movement). For this purpose there may be two parallel cross members (which may constitute a cross limb of the frame) extending between the side limbs of the frame and providing guideways along which the pivotal mounting is slidable. The pivotal mounting may be supported on sleeves slidably embracing the two cross members.

Desirably there are ground engaging feet or spuds on the ends of the side limbs of the frame. Preferably the device is provided with transport wheels.

The device may have ground engaging means (e.g. one or more feet, spuds, or skids) and transport wheels, movably mounted on the frame between positions in which said means is raised above the ground and the wheels are operative and a position in which said means is lowered into engagement with the ground and the wheels are held above the ground.

Conveniently ground engaging means are provided which are movably mounted on the frame and comprise legs having ground engaging feet, said legs being adapted to pivot between an inoperative and a ground-engaging operative position, and means for securing said legs in said ground-engaging position. Furthermore each leg is provided with a plurality of holes at spaced intervals along the length thereof for insertion of a pin for positioning said leg at a preset height. Conveniently also the means for securing each of said legs in said ground-engaging position comprise a sleeve located to receive said leg and a spring-loaded draw-bolt adapted to be received in a recess or base formed in said leg. The draw bolt is operated by means of a cable or chain connected to manually or mechanically operated control means to release said leg by withdrawal of said bolt.

The device may have means whereby the sideways swinging movement of the jib may be adjusted over different arcuate ranges.

Figure 8:
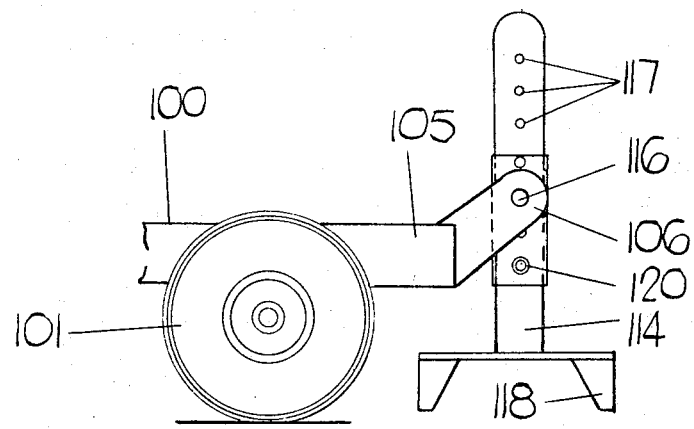

In order that the present invention may be more readily understood reference will now be made to the accompanying drawings, in which:

FIGURE 1 is a side view of one form of device according to the present invention;
FIGURE 2 is a sectional plan view thereof;
FIGURE 3 is an end view looking from the right in FIGURES 1 and 2, but omitting certain parts;
FIGURE 4 is a side elevation of a further device according to the invention;
FIGURE 5 is a plan view thereof omitting certain parts but showing a spud in elevation and plan;
FIGURE 6 is an end view looking from the right in FIGURE 4 but omitting certain parts;
FIGURE 7 is a schematic plan view of the rear of the device illustrating a modified arrangement of a spud;
FIGURE 8 is a side elevational view thereof.

Referring first to FIGURES 1–3, the device therein illustrated has a forked frame which is substantially U-shaped in plan and comprises a pair of side limbs 1 braced apart at one end by a pair of tubes 4 constituting a cross limb. Surrounding the tubes 4 are sleeves 5 to which are welded plates 6 and 6a to constitute a carriage or platform. Located relative to plates 6 and 6a is a vertical pivot post 36 which is surrounded by a sleeve or head 7 having at its lower end a turntable or foot post 17 bearing on the surface of plate 6. The limbs 1 have at one end ground engaging adjustable feet or spuds 2 and at the other end extension brackets 37 which are apertured to receive a shaft 47 carrying ground engaging wheels 3. Located on shaft 47 are a pair of sleeves 10 which, by arms 9, carry a skid, spud or ground engaging member 8. The sleeve 7 has a pair of brackets 18 and 19. To the bracket 18 a first jib member 28 is pivotally connected to swing up and down and to the bracket 19 is pivotally connected a hydraulic cylinder 29, the ram of which is connected to the first jib 28 to swing the latter up and down. Also mounted on the first jib 28 is a suitably-stayed bracket standard 35 which has pivotally mounted thereon a second hydraulic ram 30 having at its other end pivotally attached to the top end of a second jib 31 which is also pivotally suspended from the free end of the first jib 28 to swing to and fro lengthwise of the main jib 28. A bucket or grab 34 is pivotally mounted at the lower end of the second jib 31 and is operated by a third hydraulic ram 32 connected to a bracket 33 on the second jib 31.

A radial arm 13 is fixed to sleeve 7 near its bottom end and is pivotally connected to the piston of a fourth hydraulic ram 12, the end of which is pivotally connected to the end of a member 11 which may be anchored to bracket 15a or to bracket 15b mounted on plate 6. If the member 11 is mounted on bracket 15a then the arc of movement, about a vertical axis, of the jibs 28 and 31 is illustrated by the arrow A in FIGURE 2 and if the end of member 11 is connected to bracket 15b then the arc of movement of jibs 28 and 31 is indicated by arrow B.

It will be appreciated that there is an overlap between the two arcs of movement which covers the entire width of the distance between the two limbs 1, but at the same time allows for operational movement of the bucket outside the limbs 1, for purposes hereinafter mentioned.

Alternatively, matters may be so arranged that the jib may be swung around through substantially 360°. For this purpose the ram 11 is replaced by a motor which is connected by suitable reduction gearing to the sleeve 7, for example to the turntable 17 at the base of that sleeve. The motor may be an hydraulic motor supplied by pump 25.

A cross tube 27 is also mounted on tube 7 and carries a motor or engine 23 and an operator's seat 24. The motor 23 is drivingly connected through a resilient coupling 26 to a hydraulic pump 25 fed with oil from a hydraulic oil reservoir 22. A standard 20 carrying pipe lines to the various hydraulic rams previously mentioned terminates at a hydraulic control panel 21.

It will be appreciated that in use the apparatus according to the present invention is located over the area to be dug so that by appropriate manipulation of the hydraulic control on the control panel 21 the rams 29, 30 and 32 provide digging or loading action of the bucket 34. An area within the confines of the side limbs 1 of the U frame may be dug to, for example, a depth of eight feet six inches beneath the side limbs and thus the invention is particularly suitable for the digging of graves since the dub part may have either vertical or tapered sides as desired by moving the sleeves 5 along the tubes 4 to one or other side adjacent the limbs 1. Any suitable means may be provided for shifting the sleeves 5 along the tubes 4 and, if required, for clamping them in the adjusted position.

If desired the apparatus can be used for loading by locating it adjacent to, for example, a pile of rubble or the like to be loaded onto lorries, and in this event the apparatus operates outside the confines of the area defined by the limbs 1. The apparatus may be located adjacent to the rubble and operated to lift the rubble from that locality to lorries which may be backed into the area between the two limbs 1.

It will be appreciated that when used as an excavator for digging, as the bucket 34 first digs into the ground and the apparatus is pulled towards it, firstly the ground engaging feet 2 dig into the ground and secondly the ground engaging skid 8 engages the ground thus lifting the ground engaing wheels 3 clear thereof. In this position the apparatus is rigidly located and may be used for the excavation of loads of soil and the like from depths down to eight feet six inches beneath the level on which the apparatus is located. The adjustable feet 2 enable the apparatus to be used upon a sloping or uneven ground.

The apparatus itself may be moved backwards, that is to say in the direction towards the ground engaging wheels 3 so that it may be used for digging trenches. After the appropriate length of trench has been dug in position the bucket is engaged in the ground and the hydraulic rams actuated so as to "walk" the apparatus backwards. In so doing the apparatus lifts itself from its dug in position, lifting the ground engaging skid 8 out of the ground and permitting the ground engaging feet 2 to be lifted out of the ground.

The apparatus may, for example, move itself back a distance of up to twelve feet whereupon it may be immediately reused for digging a further trench.

In a further modification the skid 8 is omitted and replaced by feet resembling feet 3.

It will be appreciated that the apparatus is of the nature that may be comparatively easily dismantled by removal of the hydraulic ram 12 and lifting of the sleeve 7 off the vertical pivot 36, thus permitting the apparatus to be easily and simply transported from one locality to another.

Turning now to FIGURES 4 to 6, the frame therein shown is substantially H-shaped in plan. It comprises two spaced side limbs indicated generally at 50, joined by a cross limb consisting of cross members 51a, 51b and, if desired, by a further cross member 51c. Each side limb 50 has a front end portion 50a pivoted at 52 for adjustment about a vertical axis and a rear end portion 50b pivoted at 54 for adjustment also about a vertical axis, so that these portions may be arranged to converge or diverge. In FIG. 5, the front end portions 50a are shown as converging for a purpose hereinafter described. They may be secured in the desired attitude by quadrant plates 55a, 55b pierced with holes for the reception of locking pins 56a, 56b. Portions 50b are adjustable about a horizontal axis 53 and have forward extensions 50c (forward of axis 53) carrying the transport wheels 57. Extensions 50c are pierced with an arcuate series of holes into which locking pins 58 may be inserted to lock said portions 50b and extensions 50c in the desired attitude.

Each portion 50a, 50b is adapted to carry at its end a spud 59. Spuds 59 at the ends of the portions 50a are mounted at the lower ends of stems 60 slidable through sockets 61 and pierced with a vertical series of holes into which locking pins 62 may be inserted to provide a plurality of alternative vertical positions of the spuds. When it is desired to move the apparatus on its wheels 57, the front spuds 59 and their stems 60 are removed and are replaced by a tow bar arrangement 81 and the rear spuds 59 are moved upto an inoperative position, as illustrated in FIGS. 4 and 5.

Slidably mounted on the parallel cross members 51a, 51b there is a carriage or platform 63 carrying a stationary gear 64 and a vertical pivot post 65. Members 51a, 51b are pierced with three spaced pairs of holes for the reception of pins in a pin plate 66 pivoted to the carriage so that the latter may be fixed in any one of three laterally-adjusted positions. Pivotally mounted on the post 65 there is a head 67 which is supported from the upper surface of the gear 64 by runners 68, so as to be rotatable throughout 360°. As before, this head carries a motor or engine 23 driving a hydraulic pump 25, a reservoir 22, a control panel 21, and an operator's seat 24. There may also be a driver's cab 69.

The head 67 further carries a hydraulic motor driving, through chain and sprocket reduction gearing 70, 71, a pinion 72 meshing with the gear 64 and providing means whereby under the control of the operator the head 67 may be slewed about the axis of the pivot post 65.

Pivoted to the head 67 for movement about a horizontal pivot 73 there is a knee action jib consisting of jib arms 74a, 74b pivoted together by a horizontal pivot at 75. The jib may be raised and lowered by a hydraulic ram 76 under the control of the operator. Arm 74b which depends from its pivot 75, may be swung by that pivot by a further hydraulic ram 77 under the control of the operator, and at its lower end arm 74b has an excavating and/or lifting appliance shown as a bucket 78 pivoted to it by a horizontal pivot 79. The appliance 78 is movable about its pivot by a hydraulic ram 80 under the control of the operator. The hydraulic fluid for the rams 76, 77 and 78 is supplied by the pump 25.

Turning now to FIGURES 7 and 8 the main frame of the device is generally indicated at 100 and is supported by the ground-engaging wheels 101, 102 which are mounted on a shaft 103. The central column and assembly on which the jib is mounted for rotational movement is generally indicated by the pair of concentric circles 104. Rearwardly of the frame 100 there is a transverse support member 105 which is welded to the main frame and extending behind this support member there are two pairs of three brackets 106, 107, 108, and 109, 110 and 111. These brackets are welded or otherwise mounted on the member 105 in an inclined position as shown in FIGURE 8. Mounted between each pair of brackets 106, 107 and 110, 111, there is a sleeve 112, 113 of substantially U-section. A pair of legs 114, 115 are pivotally connected, one to each sleeve 112, 113 respectively by means of a pivot pin 116 passing through one of a plurality of holes 117 formed in each leg, the latter being provided with a ground engaging foot 118, 119. A spring-loaded draw bolt 120 slidably mounted in the three brackets 106, 107, 108 is adapted to pass through one of the holes 117 formed in the leg 114 to retain the leg in the ground engaging position (shown in FIGURE 8) when so desired. The bolt 120 is withdrawn against the spring 121 to release the leg 114, the bolt being connected by a cable 122 to a T-shaped member 123 which is in turn connected to a control lever (not shown). Operation of the control lever to rotate the T-shaped member 123 in a clockwise direction about a shaft 124 effects the withdrawal of the bolt 120 from the leg 114. A similar bolt and means of releasing the same is provided for the leg 115.

If it is required to vary the displacement between the two legs, then an arrangement such as a Bowden cable may be employed to extend or decrease the width of the ground engaging base of the device.

What we claim is:
1. An excavating device having a support frame,
 a pair of elongated, laterally spaced side members selectively adjustably pivotally mounted on said support frame for movement about a vertical axis and extending from one end of said frame;
 ground support means selectively vertically adjustably mounted on free ends of said side members;
 wheel means supporting another end of said support frame;
 boom means pivotally mounted on said support frame;
 excavating means connected to a free end of said boom means;
 power means for moving said boom means and said excavating means for excavating material adjacent said side members, and
 tow bar means adapted to be alternatively connected to said free ends of said side members for transporting the device.

2. An excavating device according to claim 1 wherein said wheel means are selectively vertically adjustably mounted on said support frame, movement of said wheel means out of contact with a supporting surface effecting movement of second ground support means into contact with the supporting surface.

3. An excavating device according to claim 2 wherein said free ends of said side members include sleeve means, said ground support means including vertically extending post means, said sleeve means selectively vertically adjustably receiving said post means, and said tow bar means include second post means adapted to be positioned in said sleeve means.

References Cited

UNITED STATES PATENTS

| | | | |
|---|---|---|---|
| 2,741,373 | 4/1956 | Edgar | 212—145 |
| 2,781,927 | 2/1957 | Holopainew | 214—138 |
| 2,812,868 | 11/1957 | Crile | 212—145 X |
| 3,021,023 | 2/1962 | Soyland et al. | 214—138 |
| 3,155,250 | 11/1964 | French et al. | 214—138 |

FOREIGN PATENTS

| | | |
|---|---|---|
| 1,051,801 | 9/1951 | France. |
| 1,310,448 | 10/1962 | France. |
| 774,162 | 5/1957 | Great Britain. |
| 153,927 | 3/1956 | Sweden. |

HUGO O. SCHULZ, *Primary Examiner.*